T. W. GRATZ, Jr.
SPRING WHEEL.
APPLICATION FILED JAN. 23, 1907.
923,643.
Patented June 1, 1909.
2 SHEETS—SHEET 1.
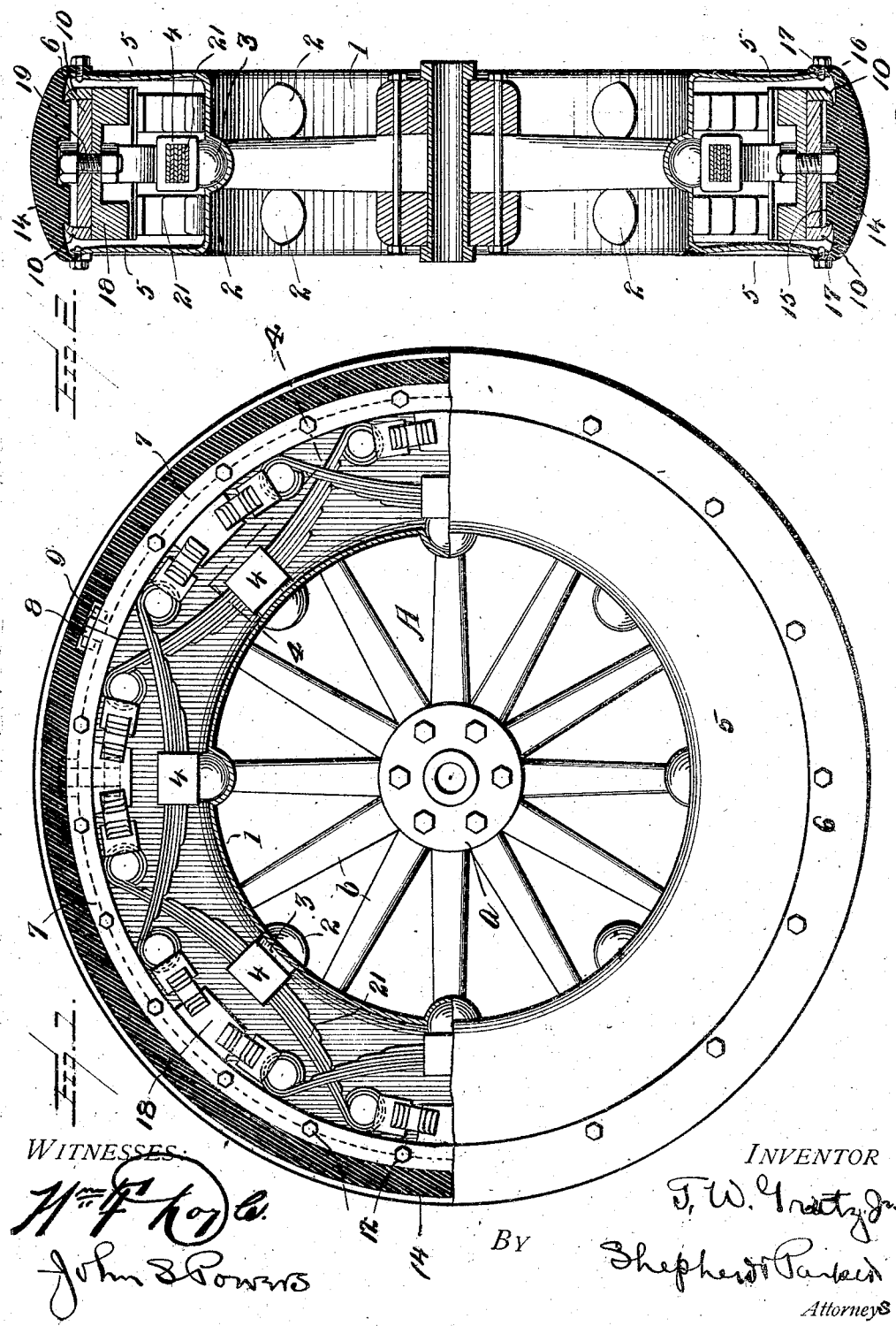

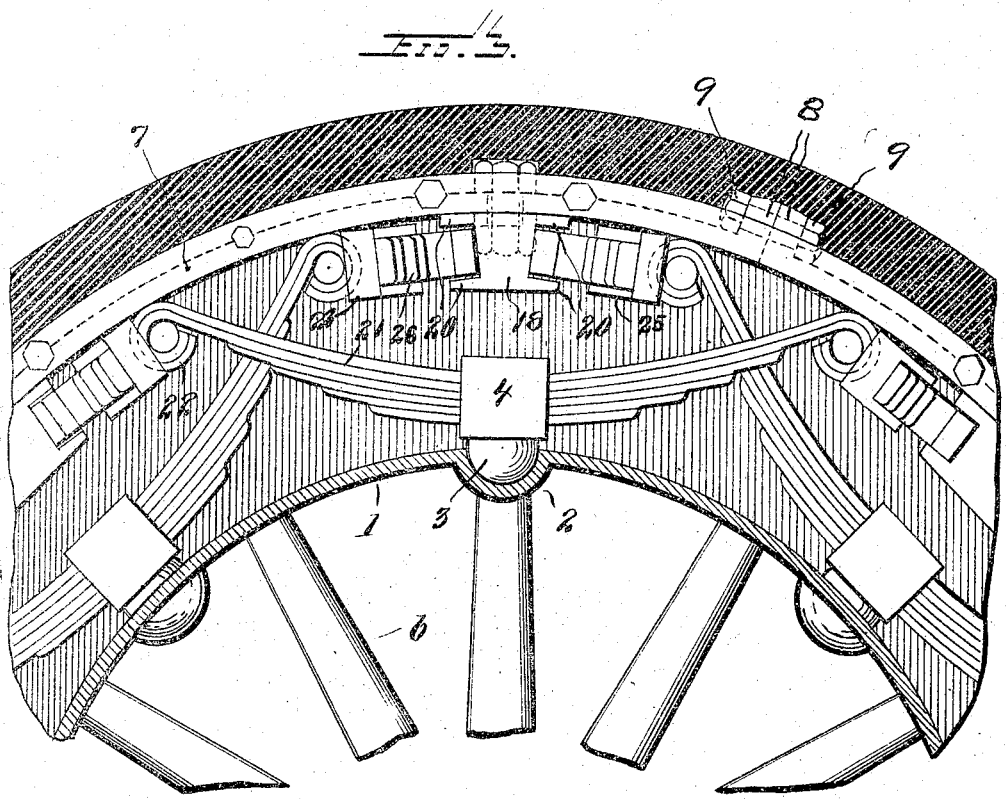
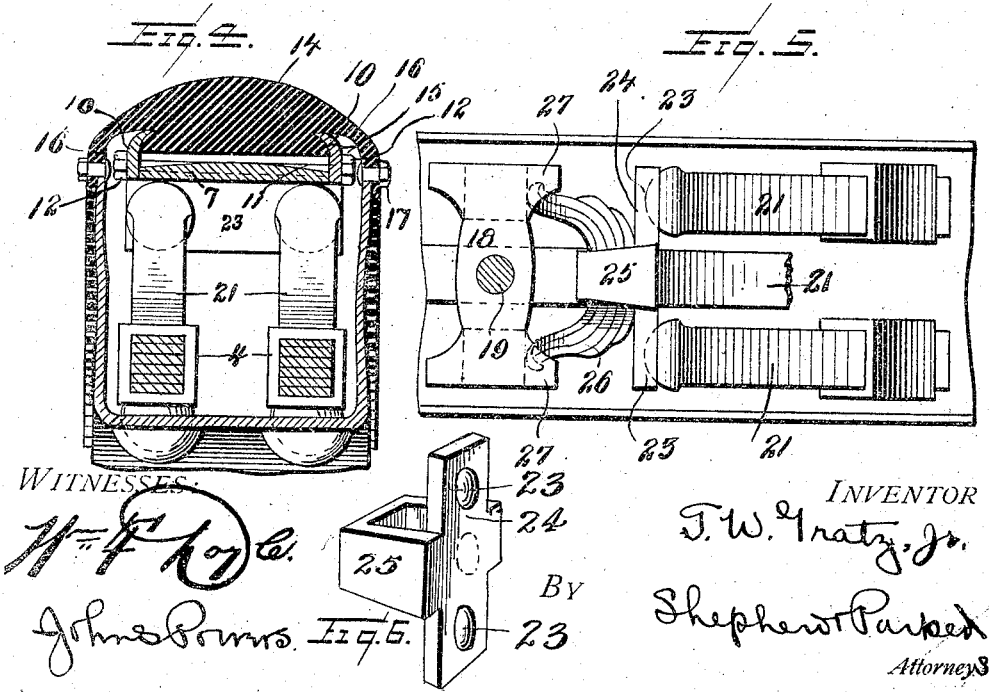

UNITED STATES PATENT OFFICE.

THEODORE W. GRATZ, JR., OF OLEAN, NEW YORK.

SPRING-WHEEL.

No. 923,643.

Specification of Letters Patent.

Patented June 1, 1909.

Application filed January 23, 1907. Serial No. 353,704.

*To all whom it may concern:*

Be it known that I, THEODORE W. GRATZ, Jr., a citizen of the United States, residing at Olean, in the county of Cattaraugus and State of New York, have invented certain new and useful Improvements in Spring-Wheels, of which the following is a specification.

This invention relates to new and useful improvements in spring wheels and it particularly contemplates a wheel in which pneumatic elements are eliminated and in which mechanical elements are relied upon for the purpose of cushioning and absorbing vibratory shocks.

In connection with a wheel of the above type, the invention aims as a primary object to provide novel means for reducing the wear upon the tire and for adding to the general flexibility thereof during the cushioning operation of the structural elements.

The invention aims as a further object to provide novel means for cushioning the shock absorbing means in their reactionary movements and for taking up the slack and back lash or play of such means.

The tire is accordingly constructed in accordance with well known physical principles and to this end comprises an outer rim which is yieldably suspended from the inner rim embodied in the construction of the wheel proper. The suspension means above referred to comprises two sets of independent springs, the one set serving as primary cushioning springs to absorb the shocks of the direct or reactionary movements of the outer rim, and the other set serving as cushioning springs to absorb the reactionary vibrations of said primary springs and to relieve the same of angular strain or of undue vibration in the incidental transmission of power and including positive connections between the rims, with which both sets of springs co-act.

Means are further provided for effecting a sealed joint between the outer and inner rims in their spaced relation to prevent the deleterious action of the dust and elements upon the component part of the wheel inclosed between the rims.

The invention finally aims to provide a wheel of the above type in which the elements may be readily assembled and disassembled, which shall be simple in construction, comparatively inexpensive to manufacture and practical and efficient in use.

The detailed construction will appear in the course of the following description in which reference is had to the accompanying drawings forming a part of this specification, like characters of reference designating similar parts throughout the several views, wherein, Figure 1 is a central longitudinal section partly in side elevation of a wheel constructed in accordance with my invention. Fig. 2 is a central transverse section thereof, the wheel being shown as an entirety, with parts in elevation. Fig. 3 is an enlarged fragmentary central longitudinal section somewhat similar to Fig. 1, with parts in elevation. Fig. 4 is an enlarged transverse section on the line 4—4 of Fig. 1, certain parts being removed for clearness. Fig. 5 is a fragmentary top plan view of the inner rim and the elements carried thereby, the outer rim and the tire and parts of the interior construction being removed, for clearness, and Fig. 6 is a detail perspective view of one of the spring-holding clips.

In the practical embodiment of my invention I employ a wheel A of conventional form embodying a hub $a$, spokes $b$ and a rim 1 of novel and peculiar construction and forming a component part of the present invention. The rim 1 constitutes the inner metallic rim of the tire and has connection with the various other constituent elements embodied in the construction of the wheel. To this end said rim is formed with semi-spherical concaved depressions 2 which are arranged in courses about the periphery of the rim, the depressions 2 of one course being disposed in staggered relation to the depressions of the other course. The recesses 2 serve as seats or sockets for spheroidal segments 3, which carry clips 4, preferably in the form of a rectangular sleeve.

The rim 1 has its side portions 5 extended outwardly in parallel relation and co-acting with the tire to form a hood for the parts inclosed therein. An outer rim 6 is arranged in exterior concentric relation to the rim 1 and is received between the side portions 5. The rim 6 is preferably made in semi or quarto annular sections 7, in order to permit the ready assemblage of the parts. The sections 7 at their ends are provided with confronting flanges 8 which are positively connected by bolt and nut fastenings 9, as will be readily apparent from Fig. 1. Adjacent their side edges the outer rim sections 7 carry co-extensive clamping sections or members 10, which are fixed to said respective sections by transverse bolts 11, as is clearly shown in Fig. 1, carrying at their ends binding nuts 12.

The rubber tire 14 is formed with an inwardly extending dove-tail projection 15 and with extended side portions 16. The members 10 engage the projection 15 as is clearly shown in Figs. 2 and 4. The sides 16 of said tire overlie the sides 5 of the rim 1 and are secured thereto by fastening screws or other suitable means 17. It will thus be seen that the rim 1 and the tire 14 in their assembled relation constitute a sealed hood for the elements inclosed therein, for the purposes previously set forth.

The rim 6 carries at equi-distant points corresponding with the determinate disposition of the depressions 2 in their staggered relation, depending clips 18 fixed by securing bolts 19. The clips 18 are provided with flanges 20 extending in parallel pairs on each side thereof for a purpose to be described. As above stated the ball segments 3 carry clips 4. These clips surround at a central point thereon superimposed leaf springs 21 which will of course, correspond as individual sets, in number and arrangement to the depressions 2 and the elements seated therein. The springs 21 are similarly arranged to the conventional carriage springs and have their free ends bent annularly upon themselves as at 22. These rounded ends 22 are adapted to bear in conformable depressions 23 illustrated in dotted lines in Fig. 5 and arranged in the transverse bar 24 of a centrally located clip 25. The latter engages at a central point imposed leaf springs 26 which at their ends bear against recessed abutments 27 provided therefor on the clip 18.

The springs 21 constitute the primary shock absorbing means above referred to and the springs 26 constitute the means for cushioning the reactionary movement of the springs 21. It will be noted that the ball and socket joint formed by the depressions 2 and the interfitting segments 3, and the pivotal joint provided at the ends of the springs 21 by reason of the recesses 23 and the interfitting rounded ends 22 constitute double compensating pivotal connections whereby the parts thus articulated may yield freely in any direction upon the slightest movement of the outer rim 6 with relation to the inner rim, and it will be appreciated that the resiliency of the various springs embodied in the connections between the rims will absorb and cushion all direct and reactionary movements of the outer rim in its yielding action.

A tire constructed in accordance with this invention will thus serve as a secondary suspension, as it were, for heavy vehicles designed for travel on rough roads, especial reference being had to touring cars.

While the elements herein shown and described are well adapted to serve the functions set forth, it is obvious that various minor changes may be made in the proportions, shape and arrangement of the several parts without departing from the spirit and scope of the invention as defined in the appended claims.

Having fully described my invention I claim:

1. A wheel of the type set forth comprising an inner fixed rim having outstanding sides, an outer rim operating within said sides, a tire spanning the outer edges of said sides and connected thereto and provided with a central longitudinal enlargement upon its inner face, curved flanges carried by said outer rim and engaging said enlargement, and resilient connections between said rims, said connections being pivotally engaged with each of said rims, substantially as described.

2. A wheel of the type set forth, comprising an inner fixed rim having outstanding sides, an outer rim operating within said sides, a tire spanning the outer edges of said sides and connected thereto and provided with a central longitudinal enlargement upon its inner face, curved flanges carried by said outer rim and engaging said enlargement, and resilient connections between said rims including means for compensating for the direct and reactionary movements of said outer rim, and means for compensating for the direct and reactionary movements of said first named means, substantially as described.

3. A wheel of the type set forth, comprising an inner fixed rim having outstanding sides, an outer rim operating within said sides, a tire spanning the outer edges of said sides and connected thereto and provided with a central longitudinal enlargement upon its inner face, curved flanges carried by said outer rim and engaging said enlargement, cushioning springs interposed between said rims and having pivotal engagement with said inner rims, clips pivotally engaged with the ends of said cushioning springs, and cushioning springs interposed between said clips and adjacent stationary parts of said outer rim, substantially as described.

4. A wheel of the type set forth, comprising an inner fixed rim having outstanding sides, an outer rim operating within said sides and comprising curved connected sections, a tire spanning the outer edges of said sides, and connected thereto and provided with a central longitudinal enlargement upon its inner face curved flanges carried by said outer rim and engaging said enlargement, and resilient connections between said rims, said connections being pivotally engaged with each of said rims, substantially as described.

5. A wheel of the type set forth, comprising an inner fixed rim having outstanding sides, an outer rim operating within said sides, a tire spanning said sides and connected thereto, connections between said tire and said outer rim, clips extending inwardly from said outer rim and centrally slotted at the sides thereof to form spaced flanges, elliptical springs centrally and pivotally connected to said inner rim and having their ends extending against said outer rim, and similarly shaped springs having their ends arranged between said flanges of said clips and against which the ends of said first named springs abut, substantially as described.

6. A wheel of the type set forth, comprising an inner fixed rim having outstanding sides, an outer rim operating within said sides and comprising curved connected sections, a tire spanning said sides and connected thereto, connections between said tire and said outer rim, clips extending inwardly from said outer rim and centrally slotted at the sides thereof to form spaced flanges, elliptical springs centrally and pivotally connected to said inner rim and having their ends extending against said outer rim, and similarly shaped springs having their ends arranged between said flanges of said clips and against which the ends of said first named springs abut, substantially as described.

In testimony whereof I affix my signature in presence of two witnesses.

THEODORE W. GRATZ, Jr.

Witnesses:
   Geo. M. Lundy,
   Geo. E. Guay.